(12) United States Patent
Gupta et al.

(10) Patent No.: US 12,235,782 B2
(45) Date of Patent: Feb. 25, 2025

(54) NoC ROUTING IN A MULTI-CHIP DEVICE (71) Applicant: XILINX, INC., San Jose, CA (US)

(72) Inventors: Aman Gupta, Sunnyvale, CA (US); Krishnan Srinivasan, San Jose, CA (US); Ahmad R. Ansari, San Jose, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 50 days.

(21) Appl. No.: 18/086,531

(22) Filed: Dec. 21, 2022

(65) Prior Publication Data

US 2024/0211422 A1    Jun. 27, 2024

(51) Int. Cl.
*G06F 13/40*    (2006.01)
*G06F 12/1009*  (2016.01)

(52) U.S. Cl.
CPC ...... *G06F 13/4022* (2013.01); *G06F 12/1009* (2013.01); *G06F 13/4036* (2013.01); *G06F 13/4068* (2013.01); *G06F 2213/0038* (2013.01)

(58) Field of Classification Search
CPC ............. G06F 12/1009; G06F 13/4022; G06F 13/4036; G06F 13/4068; G06F 2213/0038
See application file for complete search history.

(56) References Cited

U.S. PATENT DOCUMENTS

| | | | | |
|---|---|---|---|---|
| 7,509,435 B2* | 3/2009 | Dingsor | ............. | H04L 61/2517 709/246 |
| 7,831,801 B1* | 11/2010 | Anderson | ............... | G06F 13/28 712/11 |
| 10,243,882 B1* | 3/2019 | Swarbrick | ............. | H04L 49/109 |
| 10,621,129 B2* | 4/2020 | Swarbrick | ............. | G06F 13/362 |
| 2006/0095920 A1* | 5/2006 | Goossens | ............... | H04L 47/32 719/313 |
| 2011/0196973 A1* | 8/2011 | Shaheen | ................. | H04L 67/14 709/228 |
| 2011/0219208 A1* | 9/2011 | Asaad | ....................... | G06F 9/06 712/12 |
| 2014/0086246 A1 | 3/2014 | Boucard | | |
| 2015/0092792 A1* | 4/2015 | Shen | ................... | H04J 13/0003 370/479 |

OTHER PUBLICATIONS

International Search Report and Written Opinion from PCT/US2023/035541 dated Feb. 20, 2024.
Stepniewska, Marta, et al., "Network-on-Multi-Chip (NoMC) for multi-FPGA multimedia systems", 2010 13th Euromicro Conference on Digital System Design: Architectures, Methods and Tools.

* cited by examiner

*Primary Examiner* — Henry Tsai
*Assistant Examiner* — John B Roche
(74) *Attorney, Agent, or Firm* — Patterson + Sheridan, LLP (57) ABSTRACT

Embodiments herein describe a multi-chip device that includes multiple ICs with interconnected NoCs. Embodiments herein provided address translation circuitry in the ICs. The address translation circuitry establish a hierarchy where traffic originating for a first IC that is intended for a destination on a second IC is first routed to the address translation circuitry on the second IC which then performs an address translation and inserts the traffic back on the NoC in the second IC but with a destination ID corresponding to the destination. In this manner, the IC can have additional address apertures only to route traffic to the address translation circuitry of the other ICs rather than having address apertures for every destination in the other ICs.

19 Claims, 9 Drawing Sheets

NoC ROUTING IN A MULTI-CHIP DEVICE

TECHNICAL FIELD

Examples of the present disclosure generally relate to address translation and leveraging inter-die connections in a network on a chip (NoC).

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like.

The NoC can include ingress logic blocks (e.g., masters) that execute read or write requests to egress logic blocks (e.g., servants). Multi-chip devices can be formed with SoCs (e.g., an integrated circuit) that are connected together. The SoCs can include NoC connections that permit a NoC in one SoC to connect to a NoC in another SoC. This permits the NoCs on two or more SoCs to essentially function as a single NoC.

However, there are several performance challenges when interconnecting NoCs on different SoCs. For example, the address spaces of the individual NoCs may not have enough address apertures to route data directly to all the destinations in the other SoCs. Further, NoC connections across the SoCs, both horizontally and vertically, can be limited. In addition, deadlocks can occur where loops are created due to limited number of channel connections across the SoCs.

SUMMARY

One example is a multi-chip device that includes a first integrated circuit (IC) comprising a first network on a chip (NoC) and a second IC comprising a second NoC where the first and second NoCs are communicatively coupled. Moreover, when transmitting traffic from the first NoC to a local destination coupled to the second NoC in the second IC, the traffic is first routed via the first and second NoCs to address translation circuitry in the second IC where the address translation circuitry is configured to perform an address translation to identify a destination ID for the local destination and reinsert the traffic into the second NoC to reach the local destination.

Another example is a method that includes routing traffic between a first IC and a second IC in a multi-chip device. The method includes routing traffic from a first ingress logic block coupled to a first NoC in the first IC to address translation circuitry coupled to a second NoC in the second IC where the traffic is destined to a local destination in the second IC different from the address translation circuitry, performing, using the address translation circuitry, an address translation to identify a destination ID for the local destination of the traffic on the second IC, and routing, using the destination ID, the traffic from a second ingress logic block of the second NoC coupled to the address translation circuitry to an egress logic block of the second NoC corresponding to the local destination.

Another example is a multi-chip device that includes a first integrated circuit (IC) comprising a first network on a chip (NoC) and first redistribution circuitry and a second IC comprising a second NoC and second redistribution circuitry where the first and second NoCs are communicatively coupled. Moreover, when transmitting traffic from the first NoC to a local destination coupled to the second NoC in the second IC, the traffic is first routed via the first NoC to the first redistribution circuitry in the first IC where the traffic exits the first NoC, traverses through an inter-die connection between the first redistribution circuitry and the second redistribution circuitry, is inserted into the second NoC after reaching the second redistribution circuitry, and is forwarded by the second NoC to the local destination.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a multi-chip device that includes multiple SoCs with interconnected NoCs. Because the number of SoCs (or more generally, integrated circuits (ICs)) in the multi-chip device can vary (e.g., 2, 4, etc.) the NoCs on the individual SoCs may not have sufficient address space to connect to the various destinations on the other SoCs. That is, a NoC on a first SoC may not have sufficient apertures to directly route to destinations connected to NoCs on a second SoC. Embodiments herein mitigate this issue by providing address translation circuitry in the SoCs. The address translation circuitry establishes a hierarchy where traffic originating from a first SoC that is intended for a destination on a second SoC is first routed to the address translation circuitry on the second SoC which then performs an address translation and insert the traffic back on the NoC in the second SoC but with a destination ID corresponding to the local destination. In this manner, the traffic originating from a different SoC can first be routed to the address translation circuitry on the local SoC. That way, a SoC can have only additional address apertures to route traffic to the address translation circuitry of the other SoCs rather than having address apertures for every destination in the other SoCs in the multi-chip device.

Embodiments herein can also provide additional horizontal and vertical connections between NoCs in different SoCs by leveraging direct fabric connections. For example, a NoC in one SoC may have four horizontal channels, but due to beachfront limitations on the SoC, only one or two of those channels may be connected to horizontal channels in a NoC in a neighboring SoC. Instead of using only these direct NoC connections, a NoC compiler can instead route traffic to traffic redistribution circuitry in the same SoC. In one embodiment, the traffic redistribution circuitry can be implemented using programmable logic (PL) that includes direction fabric connections to PL in the neighboring SoC. These fabric connections can be used to route the traffic to the PL in the neighboring SoC (e.g., another iteration of the traffic redistribution circuitry) which then inserts the traffic on the NoC on the neighboring SoC so it can reach its ultimate destination.

Embodiments herein can also prevent deadlocks by establishing X-Y routing where traffic originating in one SoC that is destined for a different SoC has to first route through an intermediate SoC in the X (horizontal) direction before then routing in the Y (vertical) direction. This ensures loops are not created where neighboring SoCs are competing for the same resources.

Figure 1:
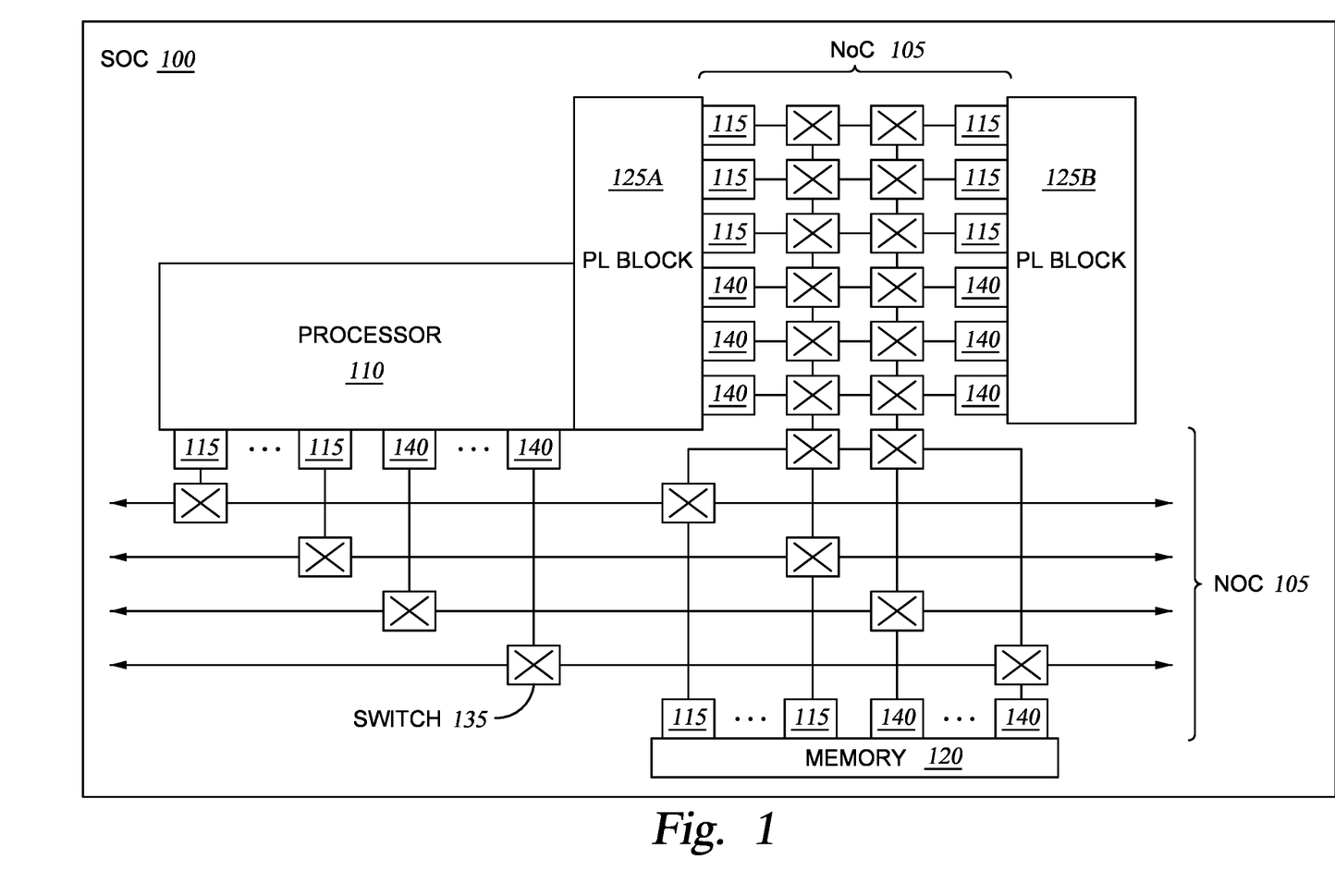
FIG. 1 is a block diagram of a SoC containing a NoC, according to an example.

FIG. 1 is a block diagram of the SoC 100 containing a NoC 105, according to an example. In one embodiment, the SoC 100 is implemented using a single IC. In one embodiment, the SoC 100 includes a mix of hardened and programmable logic. For example, the NoC 105 may be formed using hardened circuitry rather than programmable circuitry so that its footprint in the SoC 100 is reduced.

As shown, the NoC 105 interconnects a programmable logic (PL) block 125A, a PL block 125B, a processor 110, and a memory 120. That is, the NoC 105 can be used in the SoC 100 to permit different hardened and programmable circuitry elements in the SoC 100 to communicate. For example, the PL block 125A may use one ingress logic block 115 (also referred to as a NoC Master Unit (NMU)) to communicate with the PL block 125B and another ingress logic block 115 to communicate with the processor 110. However, in another embodiment, the PL block 125A may use the same ingress logic block 115 to communicate with both the PL block 125B and the processor 110 (assuming the endpoints use the same communication protocol). The PL block 125A can transmit the data to the respective egress logic blocks 140 (also referred to as NoC Slave Units or NoC Servant Units (NSU)) for the PL block 125B and the processor 110 which can determine whether the data is intended for them based on an address (if using a memory mapped protocol) or a destination ID (if using a streaming protocol).

The PL block 125A may include egress logic blocks 140 for receiving data transmitted by the PL block 125B and the processor 110. In one embodiment, the hardware logic blocks (or hardware logic circuits) are able to communicate with all the other hardware logic blocks that are also connected to the NoC 105, but in other embodiments, the hardware logic blocks may communicate with only a sub-portion of the other hardware logic blocks connected to the NoC 105. For example, the memory 120 may be able to communicate with the PL block 125A but not with the PL block 125B.

As described above, the ingress and egress logic blocks 115, 140 may all use the same communication protocol to communicate with the PL blocks 125, the processor 110, and the memory 120, or can use different communication protocols. For example, the PL block 125A may use a memory mapped protocol to communicate with the PL block 125B while the processor 110 uses a streaming protocol to communicate with the memory 120. In one embodiment, the NoC 105 can support multiple protocols.

In one embodiment, the SoC 100 is an FPGA which configures the PL blocks 125 according to a user design. That is, in this example, the FPGA includes both programmable and hardened logic blocks. However, in other embodiments, the SoC 100 may be an ASIC that includes only hardened logic blocks. That is, the SoC 100 may not include the PL blocks 125. Even though in that example the logic blocks are non-programmable, the NoC 105 may still be programmable so that the hardened logic blocks—e.g., the processor 110 and the memory 120 can switch between different communication protocols, change data widths at the interface, or adjust the frequency.

In addition, FIG. 1 illustrates the connections and various switches 135 (labeled as boxes with "X") used by the NoC 105 to route packets between the ingress and egress logic blocks 115 and 140.

The locations of the PL blocks 125, the processor 110, and the memory 120 in the physical layout of the SoC 100 are just one example of arranging these hardware elements. Further, the SoC 100 can include more hardware elements than shown. For instance, the SoC 100 may include additional PL blocks, processors, and memory that are disposed at different locations on the SoC 100. Further, the SoC 100 can include other hardware elements such as I/O modules and a memory controller which may, or may not, be coupled to the NoC 105 using respective ingress and egress logic blocks 115 and 140. For example, the I/O modules may be disposed around a periphery of the SoC 100.

Figure 2A:
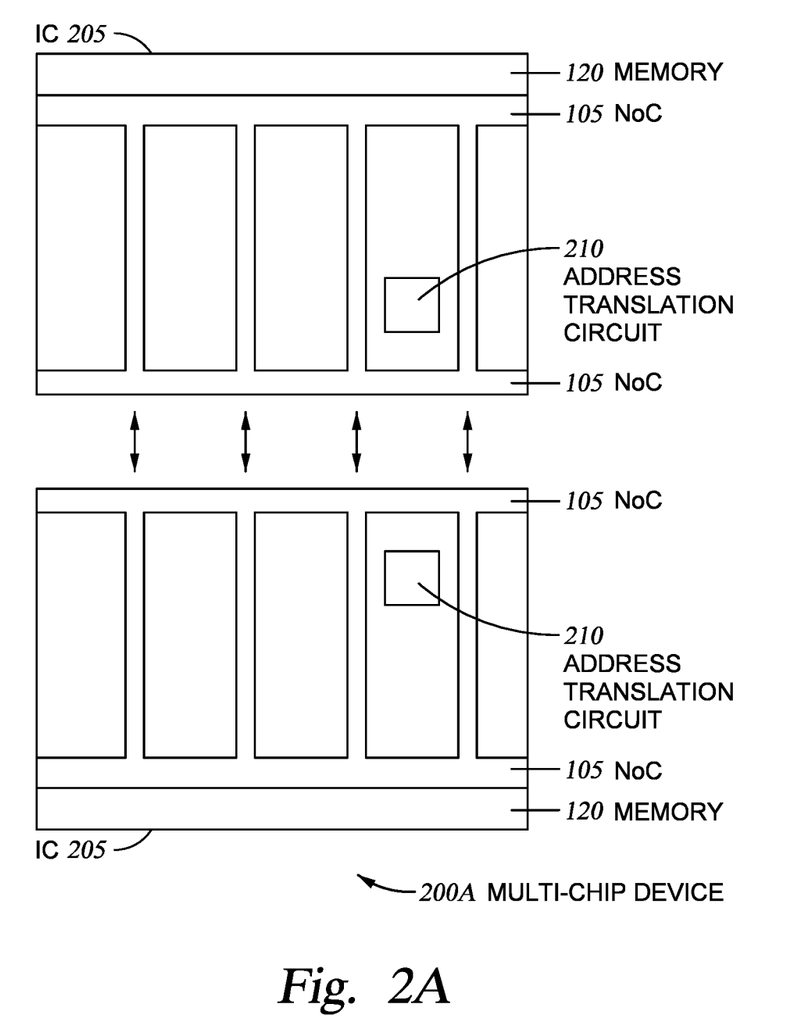
FIGS. 2A-2C illustrate multi-chip devices, according to an example.
Figure 2B:
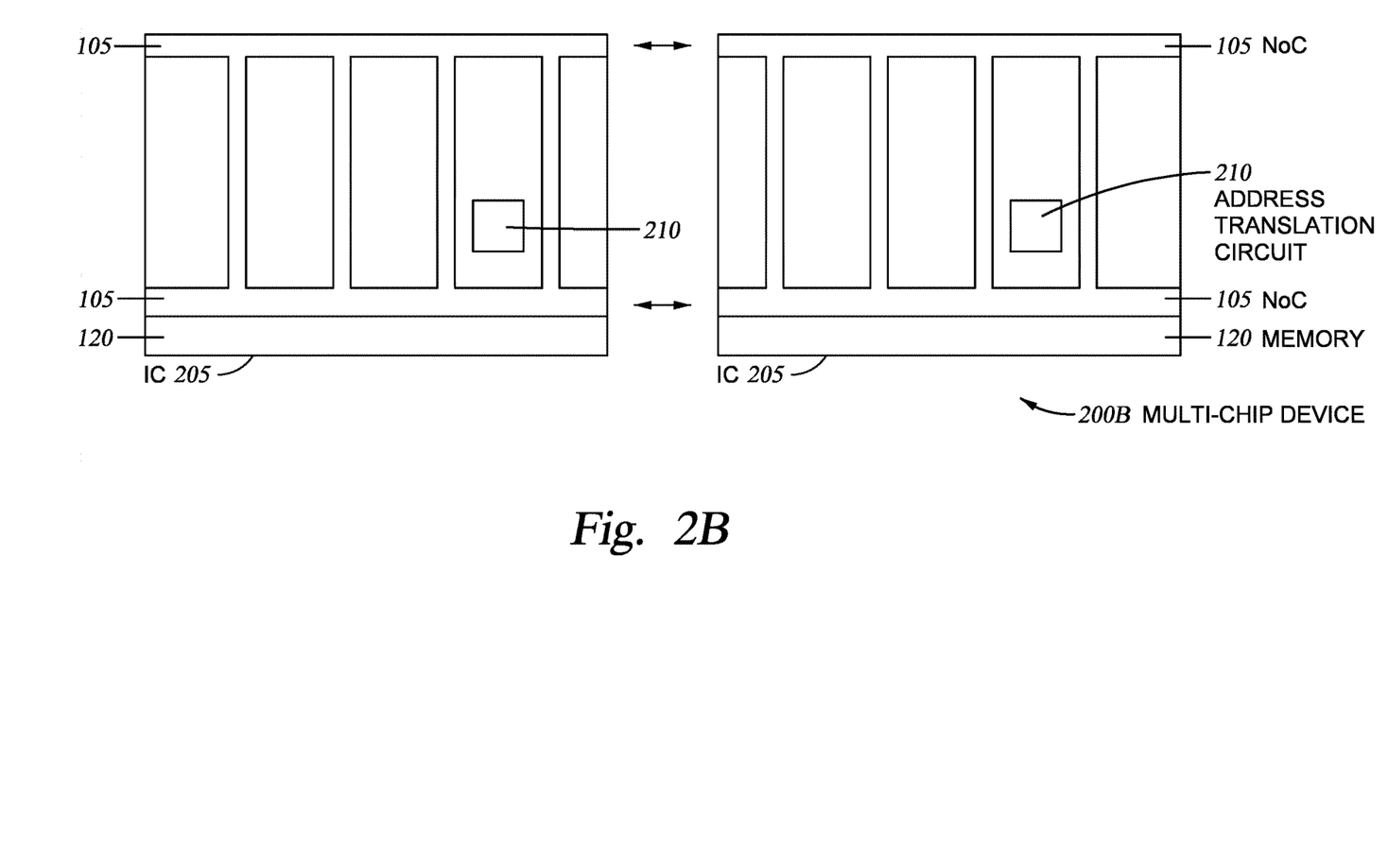
Figure 2C:
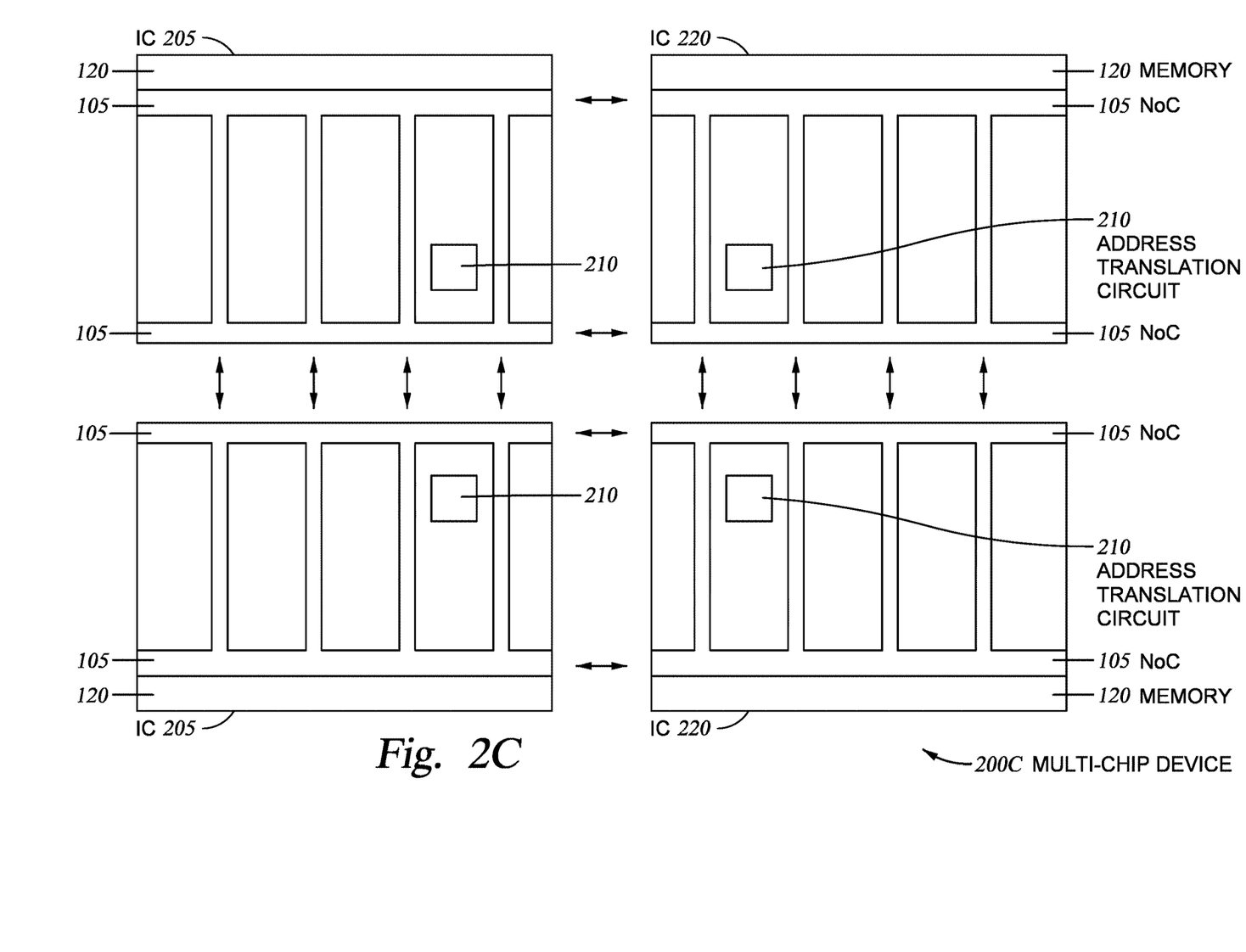

FIGS. 2A-2C illustrate multi-chip devices 200A-C, according to an example. In one embodiment, the multi-chip devices 200A-C include two or more of the SoCs 100 illustrated in FIG. 1. However, the multi-chip devices 200A-C are not limited to any particular SoC implementation. In generally, the multi-chip devices 200A-C can be formed from any number of ICs 205 which include NoCs 105.

FIG. 2A illustrates a multi-chip device 200A that includes two ICs 205 that are connected vertically. FIG. 2A illustrates a top down view of the multi-chip device 200A where the ICs 205 have been rotated 180 degrees from each other. That is, the ICs 205 are the same (e.g., generated from the same tapeout) but one IC 205 has been rotated 180 degrees from the other IC 202. The arrows indicate connections between the NoCs 105 in the two ICs 205.

In addition, the ICs 205 include address translation circuitry 210. The NoCs 105 on the individual ICs 205 (or SoCs) may not have sufficient address space to route directly to the various destinations on the other IC 205. Instead of routing traffic from a source on a NoC 105 in a first IC 205 to a destination connected to the NoC 105 in a second IC 205, the traffic is first routed to the address translation circuitry 210 on the second IC 205. This is discussed in more detail in FIGS. 3-5.

FIG. 2B a multi-chip device 200B that includes two ICs 205 that are connected horizontally. FIG. 2B illustrates a top down view of the multi-chip device 200B where the ICs 205 have the same orientation. Like in FIG. 2A, the ICs 205 in FIG. 2B are the same (e.g., generated from the same tapeout) but unlike in FIG. 2A, here the ICs 205 have the same orientation. The arrows indicate connections between the NoCs 105 in the two ICs 205.

The ICs 205 also include address translation circuitry 210 which provide a routing hierarchy where inter-IC traffic can first be routed to the address translation circuitry 210 which then performs an address translation to identify and forward the traffic to a local destination.

FIG. 2C a multi-chip device 200C that includes two pairs of ICs that are connected both vertically and horizontally. That is, the device 200C includes a first pair of ICs that include the ICs 205 and a second pair of ICs that include the ICs 220. FIG. 2C illustrates a top down view of the multi-chip device 200C where the ICs 205 have been rotated 180 degrees from each other and the ICs 220 have been rotated 180 degrees from each other. In one embodiment, the ICs 205 in FIG. 2C are the same (e.g., generated from the same tapeout) and the ICs 220 are the same, but the ICs 205 and the ICs 220 are not the same. In one embodiment, the ICs 220 are a mirror of the ICs 205. That is, while the ICs 205 and the ICs 220 are formed using different tapeouts, once the ICs 205 are designed, the ICs 220 can be easily designed by instructing an Electronic Design Automation (EDA) tool to mirror the design of the IC 205. The two pairs of mirrored ICs can then be interconnected horizontally as shown.

In one embodiment, each of the ICs 205 and 220 in the multi-chip device 200C can transmit traffic to each other using the direct NoC connections. That is, the ICs 205, 220 can transmit traffic to any of the three other ICs 205, 220 using the NoCs 105. However, since there are four ICs in FIG. 2C, the address space needed to directly route data using the NoCs 105 for one IC to all three of the other ICs is even larger. To mitigate this, the ICs 205 and 220 include the address translation circuitry 210 which provide a routing hierarchy where inter-IC traffic can first be routed to the address translation circuit 210 which then performs an address translation to identify and forward the traffic to a local destination.

Further, when routing traffic from non-neighboring ICs, the data may first be routed to the address translation circuit 210 in the intermediate IC before then being routed to the address translation circuit 210 in the destination IC. For example, if the IC 205 in the lower left of the device 200C wants to route data to a destination in the IC 220 in the upper right, the IC 205 may first use its NoC to route the traffic to the address translation circuit 210 in the IC 220 in the lower right which in turn routes the traffic to the address translation circuit 210 in the IC 220 in the upper right. This address translation circuit 210 can then forward the traffic to the local destination.

Alternatively, the IC 205 in the lower left may instead transmit the traffic through the NoC 105 in the IC 220 in the lower right and into the NoC 105 in the IC 220 in the upper right without the data being routed through the address translation circuit 210 in the IC 220 in the lower right. The address translation circuit 210 in the IC 220 in the upper right then forwards the traffic to the local destination. In this case, the NoC 105 has an address aperture for the address translation circuit 210 in the IC 220 in the upper right, and thus, can route the traffic directly there using the NoCs 105 without the aid of the address translation circuits 210 in the intermediary ICs.

Figure 3:
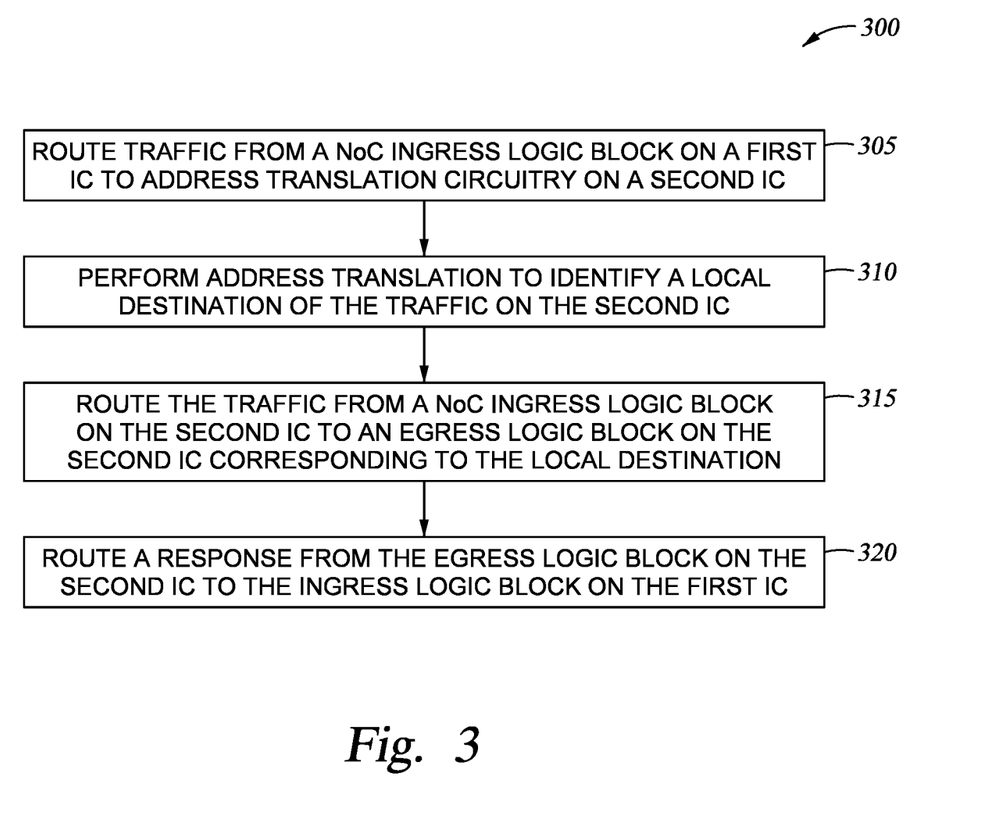
FIG. 3 is a flowchart for routing traffic between two NoCs in a multi-chip device, according to an example.

FIG. 3 is a flowchart of a method 300 for routing traffic between two NoCs in a multi-chip device, according to an example. For ease of explanation, the method 300 is discussed in tandem with FIG. 4 which illustrates a multi-chip device 400 with address translation circuitry connected to the NoCs, according to an example.

At block 305, an ingress logic block on a first IC routes traffic to an address translation circuit on a second IC in the multi-chip device. Using FIG. 4 as an example, Client A on the IC 405A wants to transmit traffic to a destination on the IC 405B. The Client A can be PL, a processor, memory, etc. in the IC 405A. Furthermore, the ICs 405A-D can be related as shown in FIG. 2C where the ICs 405A and 405D are the same but rotated 180 degrees from each other and the ICs 405B and 405C are mirrored tapeouts of the ICs 405A and 405D but rotated 180 degrees from each other. However, this is not a requirement. In other embodiments, the ICs 405 may be all different ICs which nonetheless have their NoCs interconnected. However, coupling together ICs with the same (or mirrored) layouts simplifies the process of forming a multi-chip device, but it is not a requirement.

Figure 4:
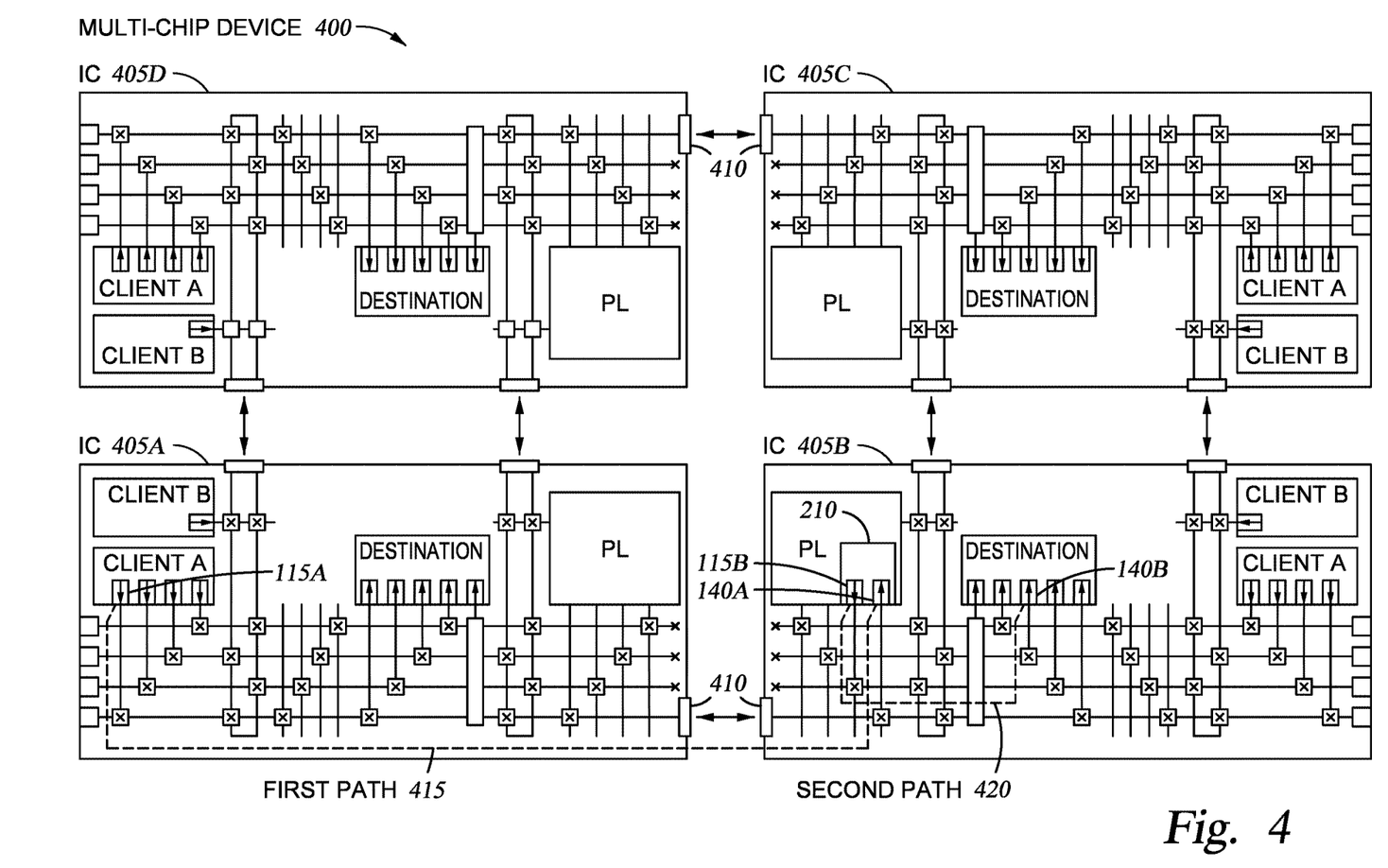
FIG. 4 illustrates a multi-chip device with address translation circuitry connected to the NoCs, according to an example.

As shown, Client A has four ingress logic blocks for inserting traffic into the NoC of the IC 405A. In this example, it is assumed that the NoC in the IC 405A does not have sufficient address space to route data directly to the destination in the IC 405B. That is, the ingress logic block 115A may not know the destination ID for the destination in the IC 405B. However, the NoC in the IC 405A does include an address aperture for the address translation circuitry 210 in the IC 405B. In one embodiment, the destination ID for the address translation circuitry 210 in the IC 405B may be stored in a remap register for the NoC in the IC 405A. Remap registers provide flexibility to NoC addressing and are typically used for debugging purpose or when there is an error. However, the remap registers can also be used when the ICs 405 are placed in a multi-chip device to provide destination IDs to destinations in the other ICs, such as the address translation circuitry 210.

In FIG. 4, the NoC in the IC 405A routes the traffic to NoC connections 410 that permit the NoC in the IC 405A to communicate with the NoC in the IC 405B. In one embodiment, the NoC connections 410 are located at the periphery of the ICs 405 and provide direct connections so that the traffic does not first propagate through any input/output elements (e.g., transceivers) on the ICs 405. In one embodiment, the NoC connections 410 may use connections in an interposer or substrate on which ICs 405 are disposed. That is, the NoC connections 410 may be attached to connections or traces in the interposer which communicatively the two NoC connections 410. In one embodiment, the NoC connections 410 are referred to as inter-die connections for coupling two NoCs together.

In one embodiment, the traffic is routed from Client A in the IC 405A to the circuitry 210 in IC 405B using the destination ID of the circuitry 210. For example, each packet or flit can be routed through the switches in the NoCs in the ICs 405A and 405B using the destination ID of the circuitry 210. A NoC compiler programs the switches to know the next hop associated with the destination ID. In this manner, the traffic can proceed through the switches in the NoCs in both ICs 405A and 405B along a first path 415 until reaching the egress logic block 140A for the address translation circuitry 210.

Returning to method 300, at block 310, the address translation circuitry performs an address translation to identify a local destination of the traffic on the second IC. That is, in addition to including a destination IC used to route the traffic through the NoCs, the traffic can also include an address which the address translation circuitry can then use to identify the local destination of the traffic on the IC. This address can be a source address or a destination address.

Again referring to FIG. 4, the address translation circuitry 210 can perform an address translation to determine the local destination for the traffic. That is, the result of the address translation is a destination ID for the local destination on the IC 405B for the traffic. The address translation circuitry 210 can then reinsert the traffic into the NoC using an ingress logic block 115B, but this time the traffic includes the destination ID for the local destination.

At block 315, the NoC on the second IC routes the traffic from the NoC ingress logic block on the second IC to the egress logic block on the second IC corresponding to the local destination. This is illustrated in FIG. 4 where the NoC in the IC 405B routes the traffic to the destination as shown by the second path 420 where it is received by an egress logic block 140B for the destination.

In this manner, the NoC on the IC 405A (or more specifically, the address apertures in the NoC) does not have to be programmed to recognize the destination ID for the local destination on the IC 405B. Instead, the NoC in the IC 405A can be programmed to have an address aperture for the address translation circuitry 210 which then identifies the destination IDs for the various destinations in the IC 405B. This can greatly reduce the number of address apertures needed in each of the NoCs in the ICs 405 when forming a multi-chip device.

In one embodiment, the address translation circuitry 210 is implemented in PL in the ICs 405. However, in another embodiment, the address translation circuitry 210 may be hardened logic in the ICs 405. While using PL to implement the address translation circuitry 210 offers more flexibility (e.g., can scale as the number of ICs in the multi-chip device scales), implementing the circuitry 210 in hardened logic may require less space in the ICs.

At block 320, the NoCs in the first and second ICs route a response from the egress logic block on the second IC corresponding to the local destination to the ingress logic block on the first IC. Again referring to FIG. 4, the egress logic block 140B for the local destination on the IC 405B can route the response directly to the ingress logic block 115A for Client A on the IC 405A. Notably, this response does not have to route through the address translation circuitry 210 on the IC 405B (or any address translation circuitry on the IC 405A). The response can be routed using the already known destination ID for the Client A, and as such, another address translation is not needed.

The method 300 can also be used to route traffic between ICs that are not direct neighbors in the IC. That is, the method 300 can be used to route traffic from the IC 405A to the IC 405C in FIG. 4 which do not have direct connections to each other. If the IC 405A has sufficient available address apertures, the IC 405A can insert traffic that flows from its NoC to the NoC in the IC 405B, from the NoC in the IC 405B to the NoC in the IC 405C, and from the NoC in the IC 405C to address translation circuitry in the IC 405C. As discussed above, the address translation circuitry in the IC 405C can perform the address translation and reinsert the traffic into the NoC in the IC 405C so it can reach the local destination.

However, the NoC in the IC 405A may not have sufficient address apertures to route traffic to the address translation circuitry in the IC 405C. In that case, the traffic may be routed to the address translation circuitry 210 in the IC 405B as shown in FIG. 4. The address translation circuitry 210 can then identify the destination ID for the address translation circuitry in the IC 405C and then reinsert the traffic into the NoC in the IC 405B which then routes the traffic to the NoC in the IC 405C and then to its address translation circuitry which performs an additional address translation which routes the traffic to the local destination on the IC 405C. Thus, in this example, traffic flowing between non-neighboring ICs in the multi-chip device can be routed through the address translation circuitry in an intermediate IC (e.g., the IC 405B in this example), or can bypass the address translation circuitry in the intermediate IC and instead rely solely on the address translation circuitry in the destination IC (e.g., the IC 405C).

Figure 5:
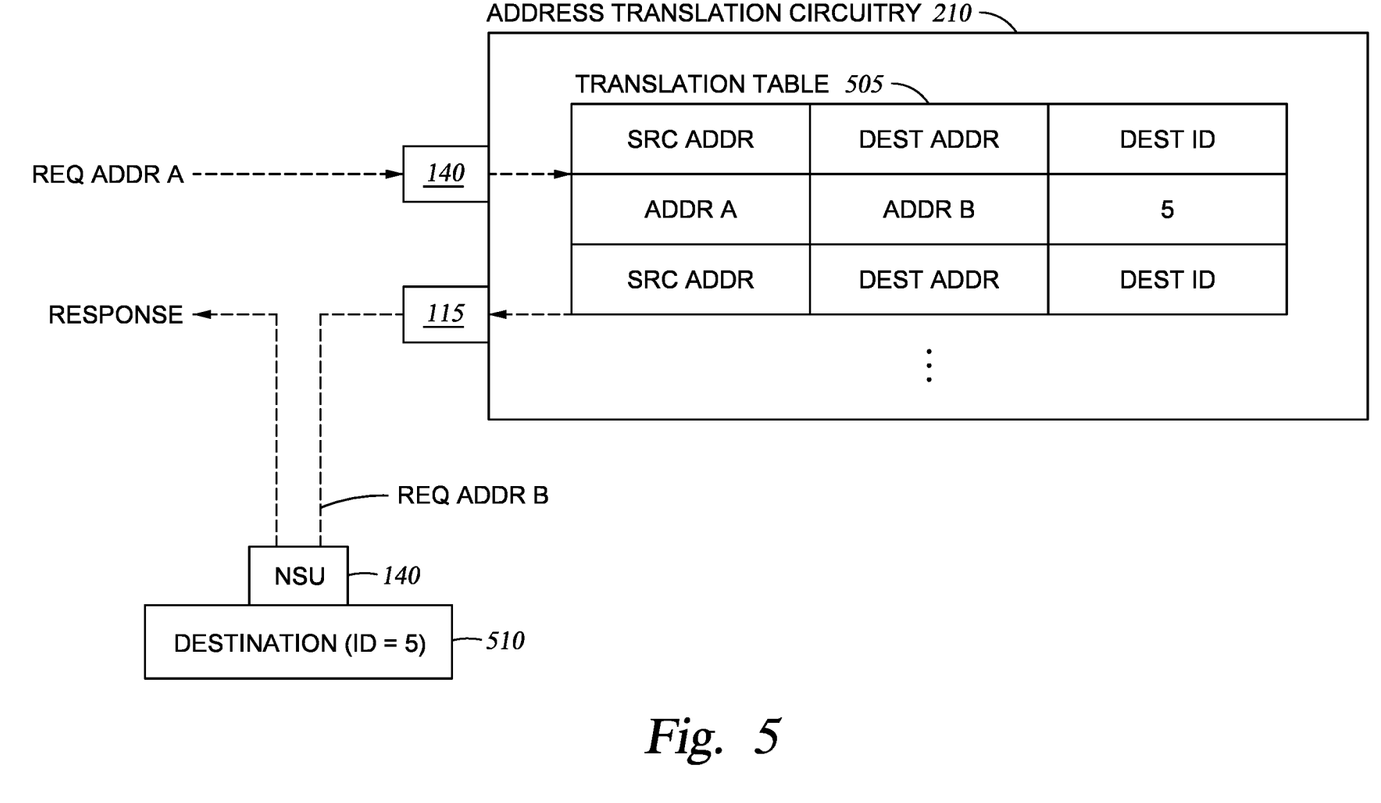
FIG. 5 illustrates an address translation table, according to an example.

FIG. 5 illustrates an address translation table 505, according to an example. As shown, the address translation table 505 is contained within the address translation circuitry 210. For example, the address translation table 505 can be stored in memory in the address translation circuitry 210.

The address translation circuitry 210 receives traffic (labeled as REQ ADDR A) at an egress logic block 140. The address translation circuitry 210 uses ADDR A in the request to index into the table 505 to identify an entry corresponding to that address. In this example, the ADDR A is a source address.

The table 505 then returns the destination address (ADDR B) and the destination ID (5) for the local destination. With this information, the address translation circuitry 210 uses an ingress logic block 115 to re-insert the traffic into the NoC which has the destination ID (5) for the destination circuit 510. The NoC then routes the traffic to an egress logic block 140 for the destination circuitry 510.

Once received, the egress logic block 140 for the destination circuitry 510 can send a response to the ingress logic block that initiated the traffic (i.e., that transmitted the REQ ADDR A to the address translation circuitry 210). Note that this response can bypass the address translation circuitry 210. Stated differently, the response can be routed without having to pass through the address translation circuitry.

Figure 6:
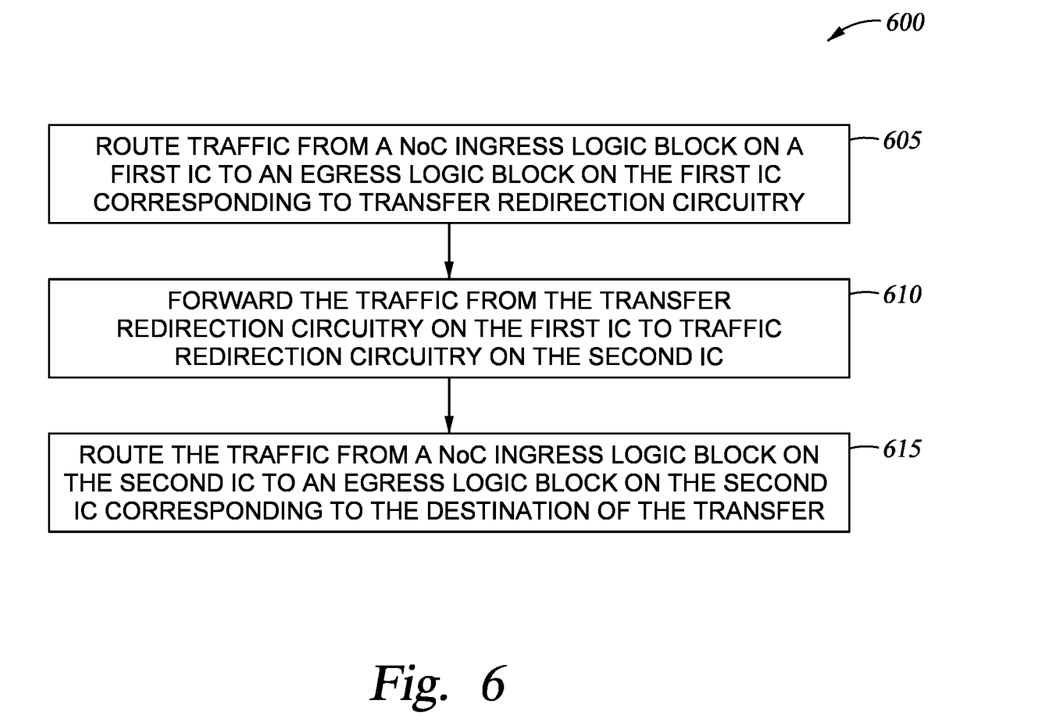
FIG. 6 is a flowchart for routing traffic between two NoCs in a multi-chip device, according to examples.
Figure 7:
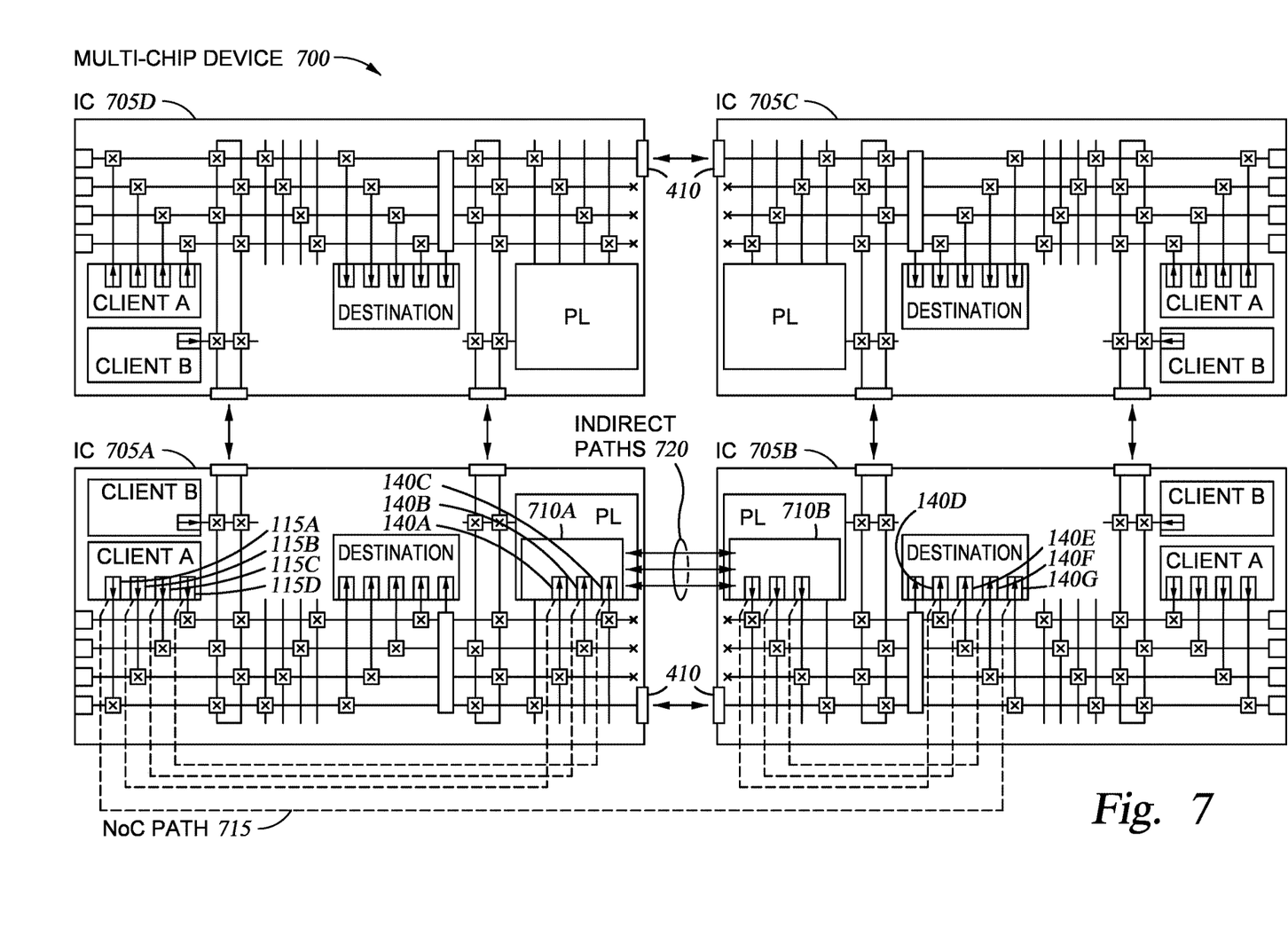
FIG. 7 illustrates a multi-chip device with traffic redistribution circuitry connected to the NoCs, according to examples.

FIG. 6 is a flowchart of a method 600 for routing traffic between two NoCs in a multi-chip device, according to examples. For ease of explanation, the method 600 is discussed in tandem with FIG. 7 which illustrates a multi-chip device 700 with redistribution circuitry connected to the NoCs, according to examples. In FIGS. 6 and 7 it is assumed that the multi-chip device does not have sufficient NoC connections (e.g., inter-die NoC-to-NoC) connections to facilitate the amount of traffic that one IC wants to send to another IC.

At block 605, a NoC ingress logic block on a first IC routes traffic to an egress logic block on the first IC corresponding to redistribution circuitry. In one embodiment, the redistribution circuitry is on the same IC as the egress logic block inserting the traffic into the NoC. For example, FIG. 7 illustrates three ingress logic blocks 115B, 115C, and 115D inserting traffic into the NoC of the IC 705A which is received at egress logic blocks 140A, 140B, and 140C corresponding to the redistribution circuitry 710A. In this case, the "X's" indicate horizontal channels (e.g., virtual channels) in the NoC that are not connected to corresponding horizontal channels in the NoC in the IC 705B. For example, there may be insufficient beachfront in the ICs 705A-D to have a NoC connection for each of the horizontal channels. In this embodiment, only one of the horizontal channels is directly connected to a horizontal channel in the NoC in the IC 705B using respective NoC connections.

However, the ICs 705A-D have other connections to each other besides the NoC connections. In this example, the PL in the ICs have PL-to-PL connections (also referred to as fabric-to-fabric connections) between the ICs 705A-D. These connections are illustrated as the indirect paths 720 that provide indirect communication between the NoCs in two different ICs in contrast to the direct NoC path 715. In any case, traffic can flow between the NoCs in the ICs 705A and 705B via the indirect paths 720 and the direct NoC path 715 in parallel or simultaneously.

Returning to FIG. 6, at block 610 the redistribution circuitry forwards the traffic received from the NoC to redistribution circuitry on a second IC using, e.g., the PL-to-PL connections. While the embodiments herein describe using PL-to-PL connections, other multi-chip devices may have different types of inter-die connections such as memory-to-memory connections. Thus, the embodiments herein are not limited to using PL-to-PL connections to facilitate the indirect paths 720 illustrated in FIG. 7.

At block 615, the redistribution circuitry in the second IC routes the traffic from a NoC ingress logic block on the second IC to an egress logic block on the second IC corresponding to the destination of the traffic. Put differently, traffic exits the NoC in the first IC, is forwarded to the redistribution circuitry in the second IC which then inserts the traffic into a NoC in the second IC where it is routed to the local destination. As an example, FIG. 7 illustrates three NoC traffic flows that are redirected through the indirect paths 720 between the redistribution circuitry 710A and 710B. The redistribution circuitry 710B then uses three ingress logic blocks 115E, 115F, and 115G to insert these three traffic flows into the NoC on the IC 705B which in turns routes this traffic to the egress logic blocks 140D, 140E, and 140F corresponding to their destinations in the IC 705B.

In contrast, the traffic inserted by the ingress logic block 115A in the IC 705A can use the direct NoC path 715 (which uses the NoC connections) to transmit the traffic directly from the NoC in the IC 705A to the NoC in the IC 705B where it is routed to the egress logic block 140G at the local destination. Thus, this traffic flow bypasses the redistribution circuitry 710A and 710B.

Although not shown, the redistribution circuitry 710 and the indirect paths 720 may be used in combination with the address translation circuitry discussed in FIGS. 3-5. For example, the PL in the IC 705B may include address translation circuitry. In that case, the traffic flows inserted into the NoC by the ingress logic blocks 115B, 115C, and 115D still go to the redistribution circuitry 710A where they then use the indirect paths 720 to reach the IC 705B. However, instead of being immediately inserted into the NoC in the IC 705B, the address translation circuitry in the IC 705B may perform the address translation discussed above to identify the local destinations for the three traffic flows. Once the translation is performed, the three traffic flows are inserted into the NoC in the IC 705B.

Similarly, the traffic flow inserted into the NoC in the IC 705A by the ingress logic block 115A can still use the direct NoC path 715 to reach the IC 705B, but instead of the traffic going directly to the local destination, it is first routed to the address translation circuitry and then to its local destination as illustrated in FIG. 4. Thus, the address translation discussed in FIGS. 3-5 can be used in combination with the indirect paths illustrated in FIGS. 6 and 7, or the concepts can be used independently of one another.

In one embodiment, the redistribution circuitry 710 is implemented in PL in the ICs 705A-D. However, in another embodiment, the redistribution circuitry 710 may be hardened logic in the ICs 705A-D so long as this hardened logic has access to inter-die connections. While using PL to implement the redistribution circuitry 710 offers more flexibility (e.g., can scale as the number of ICs in the multi-chip device scales), implementing the redistribution circuitry 710 in hardened logic may require less space in the ICs.

In yet another embodiment, X-Y routing can be used to avoid deadlocks between the ICs in a multi-die device. Using FIG. 7 as an example, the ICs may attempt to transmit data using a X pattern where, e.g., IC 705A is attempting to transmit traffic to IC 705C while IC 705B is attempting to transmit traffic to IC 705D. IC 705A may be waiting on resources to free up in IC 705B in order to reach IC 705C at the same time the IC 705B is waiting for resources to free up in IC 705C to reach IC 705D, and so forth. In some scenarios, the four ICs 705A-D may be waiting for resources which can result in a deadlock. In one embodiment, the deadlock is avoided by using an X-Y routing policy where the ICs first route in the X (horizontal) direction (e.g., a first dimensions in the array) before then routing in the Y (vertical) direction (e.g., a dimension in the array that is perpendicular to the first dimension). This breaks any deadlock.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A multi-chip device, comprising:
a first integrated circuit (IC) comprising a first network on a chip (NoC); and
a second IC comprising a second NoC, wherein the first and second NoCs are communicatively coupled,
wherein, when transmitting traffic from the first NoC to a local destination coupled to the second NoC in the second IC, the traffic is first routed via the first and second NoCs to address translation circuitry in the second IC, and wherein the address translation circuitry is configured to perform an address translation to identify a destination ID for the local destination, add the destination ID into the traffic, and reinsert the traffic into the second NoC to reach the local destination.

2. The multi-chip device of claim 1, wherein the first IC includes a first NoC connection that directly couples the first NoC to a second NoC connection in the second IC coupled to the second NoC, and wherein the first and second NoC connections are disposed at peripheries of the first and second ICs.

3. The multi-chip device of claim 1, wherein the address translation comprises using an address in the traffic received from the first IC to index into a translation table to identify the destination ID for the local destination.

4. The multi-chip device of claim 1, wherein the first IC includes an ingress logic block that inserts the traffic into the first NoC and the second IC includes an egress logic block that receives the traffic from the second NoC and forwards the traffic to the local destination, and wherein, after receiving the traffic, the egress logic block is configured to transmit a response to the ingress logic block that is routed via the first and second NoCs without having to pass through the address translation circuitry.

5. The multi-chip device of claim 1, wherein the first IC comprises first redistribution circuitry coupled to the first NoC and the second IC comprises second redistribution circuitry coupled to the second NoC, and
wherein the multi-chip device is configured to, when transmitting traffic from the first NoC to a local destination coupled to the second NoC in the second IC, route the traffic to the first redistribution circuitry where the traffic exits the first NoC, traverses through an inter-die connection between the first redistribution circuitry and the second redistribution circuitry, is inserted into the second NoC after reaching the second redistribution circuitry, and is forwarded by the second NoC to the local destination.

6. The multi-chip device of claim 5, wherein the inter-die connection is at least one of a programmable logic (PL)-to-PL connection or a fabric-to-fabric connection.

7. The multi-chip device of claim 1, further comprising:
a third IC comprising a third NoC communicatively coupled to the first and second NoCs, wherein the first, second, and third ICs are arranged in an array defining a first dimension and a second dimension that is perpendicular to the first dimension.

8. The multi-chip device of claim 7, wherein, when routing traffic to a non-neighboring IC, the first, second, and third NoCs are configured to first route in a first dimension before routing in the second dimension to prevent deadlocks.

9. A method for routing traffic between a first integrated circuit (IC) and a second IC in a multi-chip device, comprising:
routing traffic from a first ingress logic block coupled to a first network on chip (NoC) in the first IC to address translation circuitry coupled to a second NoC in the second IC, wherein the traffic is destined to a local destination in the second IC different from the address translation circuitry;
performing, using the address translation circuitry, an address translation to identify a destination ID for the local destination of the traffic on the second IC and add the destination ID into the traffic; and
routing, using the destination ID, the traffic from a second ingress logic block of the second NoC coupled to the address translation circuitry to an egress logic block of the second NoC corresponding to the local destination.

10. The method of claim 9, further comprising:
routing a response from the egress logic block on the second IC to the first ingress logic block on the first IC without the response passing through the address translation circuitry.

11. The method of claim 9, wherein the first IC includes a first NoC connection that directly couples the first NoC to a second NoC connection in the second IC coupled to the second NoC, and wherein the first and second NoC connections are disposed at peripheries of the first and second ICs.

12. The method of claim 9, wherein the address translation comprises using an address in the traffic received from the first IC to index into a translation table to identify the destination ID for the local destination.

13. The method of claim 9, further comprising before routing the traffic to the address translation circuitry:
routing the traffic to first redistribution circuitry in the first IC where the traffic exits the first NoC; and
routing the traffic through an inter-die connection between the first redistribution circuitry and second redistribution circuitry in the second IC.

14. The method of claim 9, wherein the multi-chip device comprises a third IC comprising a third NoC communicatively coupled to the first and second NoCs, and wherein the first, second, and third ICs are arranged in an array defining a first dimension and a second dimension that is perpendicular to the first dimension.

15. The method of claim 14, further comprising:
routing traffic to a non-neighboring IC in the array by first routing the traffic in the first dimension before routing the traffic in the second dimension to prevent deadlocks.

16. A multi-chip device, comprising:
a first integrated circuit (IC) comprising a first network on a chip (NoC) and first redistribution circuitry; and
a second IC comprising a second NoC and second redistribution circuitry, wherein the first and second NoCs are communicatively coupled,
wherein, when transmitting traffic from the first NoC to a local destination coupled to the second NoC in the second IC, the traffic is first routed via the first NoC to the first redistribution circuitry in the first IC where the traffic exits the first NoC, traverses through an inter-die connection between the first redistribution circuitry and the second redistribution circuitry, is inserted into the second NoC after reaching the second redistribution circuitry, and is forwarded by the second NoC to the local destination, and
wherein the first IC includes a first NoC connection that directly couples the first NoC to a second NoC connection in the second IC coupled to the second NoC, wherein traffic can be transmitted between the first and second NoCs using the inter-die connection and the first and second NoC connections in parallel.

17. The multi-chip device of claim 16, wherein the inter-die connection is at least one of a programmable logic (PL)-to-PL connection or a fabric-to-fabric connection.

18. The multi-chip device of claim 16, wherein, when transmitting the traffic from the first NoC to the local destination coupled to the second NoC in the second IC, the traffic is first routed to address translation circuitry in the second IC, and wherein the address translation circuitry is configured to perform an address translation to identify a destination ID for the local destination.

19. The multi-chip device of claim 18, wherein the address translation comprises using an address in the traffic received from the first IC to index into a translation table to identify the destination ID for the local destination.

* * * * *